(12) United States Patent
Tiller et al.

(10) Patent No.: US 7,139,350 B2
(45) Date of Patent: Nov. 21, 2006

(54) METHOD AND APPARATUS FOR MEASURING RADIATION IN A BOREHOLE

(75) Inventors: Donald E. Tiller, Fort Worth, TX (US); Richard C. Odom, Benbrook, TX (US); Robert D. Wilson, Fort Worth, TX (US)

(73) Assignee: Precision Energy Services, Inc., Houston, TX (US)

( * ) Notice: Subject to any disclaimer, the term of this patent is extended or adjusted under 35 U.S.C. 154(b) by 480 days.

(21) Appl. No.: 10/307,033

(22) Filed: Nov. 27, 2002

(65) Prior Publication Data

US 2003/0138067 A1    Jul. 24, 2003

Related U.S. Application Data

(60) Continuation of application No. 10/307,033, filed on Nov. 27, 2002, which is a division of application No. 10/000,374, filed on Oct. 23, 2001.

(51) Int. Cl.
  *G21G 1/06* (2006.01)
(52) U.S. Cl. ............... 376/160; 376/158; 376/159; 250/269.6; 250/269.1
(58) Field of Classification Search ............... 376/160, 376/153, 158, 159; 250/253, 269.6, 269.1
See application file for complete search history.

(56) References Cited

U.S. PATENT DOCUMENTS

| 3,586,858 | A | * | 6/1971 | Youmans | 250/259 |
|---|---|---|---|---|---|
| 3,688,114 | A | | 8/1972 | Youmans | |
| 3,781,545 | A | * | 12/1973 | Paap et al. | 376/163 |
| 3,833,809 | A | * | 9/1974 | Beil | 250/269.8 |
| 3,885,154 | A | * | 5/1975 | Culver | 250/267 |
| 3,940,610 | A | * | 2/1976 | Dennis et al. | 250/253 |
| 4,136,279 | A | * | 1/1979 | Hopkinson | 250/269.8 |
| 4,387,302 | A | * | 6/1983 | Givens | 250/269.2 |
| 4,446,368 | A | | 5/1984 | Koenn et al. | |
| 4,788,424 | A | * | 11/1988 | Preeg | 250/269.8 |
| 4,883,956 | A | * | 11/1989 | Melcher et al. | 250/269.2 |
| 4,910,397 | A | * | 3/1990 | Mills et al. | 250/264 |
| 5,025,151 | A | | 6/1991 | Melcher | |
| 5,081,351 | A | * | 1/1992 | Roscoe et al. | 250/269.7 |
| 5,105,080 | A | * | 4/1992 | Stoller et al. | 250/269.7 |
| 5,313,504 | A | | 5/1994 | Czirr | |
| 5,461,909 | A | * | 10/1995 | Arnold | 73/152.14 |
| 5,521,378 | A | | 5/1996 | Roscoe et al. | |

(Continued)

OTHER PUBLICATIONS

Baryshvesky et al., "YAlO3:Ce—fast acting scintillators for detection of ionizing radiation," Nuclear instruments and Methods in Physics Research b58 (1991), pp. 291-293.*

(Continued)

*Primary Examiner*—Ricardo Palabrica
(74) *Attorney, Agent, or Firm*—Patrick H. McCollum (57) ABSTRACT

Apparatus and methods for measuring radiation in a borehole environment using a YAlO$_3$:Ce (YAP) scintillation crystal. Borehole instruments are disclosed which employ a gamma ray detector comprising a YAP scintillator coupled to a light sensing means such as a photomultiplier tube. One instrument embodiment combines a YAP scintillation detector and a source of pulsed neutrons. Borehole environs are irradiated with neutrons, and induced gamma radiation is measured using a YAP scintillation detector. Response of the detector is used to determine characteristics of the borehole environs. Mechanical and physical properties of YAP are utilized to obtain improved measurements. The relatively short light decay constant of YAP minimized pulse pile-up in the detector when measurements require that the detector be operated during a neutron pulse.

16 Claims, 5 Drawing Sheets

U.S. PATENT DOCUMENTS

| | | | |
|---|---|---|---|
| 5,600,135 | A | 2/1997 | Jacobson |
| 5,864,141 | A | 1/1999 | Majewski et al. |
| 5,866,907 | A * | 2/1999 | Drukier et al. ............. 250/366 |
| 6,078,052 | A | 6/2000 | DiFilippo |
| 2002/0170711 | A1 * | 11/2002 | Nuth ........................ 166/254.2 |

OTHER PUBLICATIONS

Blazek et al, YAP Multi-Crystal Gamma Camera Prototype, IEEE Transactions on Nuclear Science, vol. 42, No. 5, Oct. 1995, pp. 1474-1482.

Moszynski et al, Blue Enhanced Large Area Avalanche Photodiodes in Scintillation Detection with LSO, YAP and LuAP Crystals, IEEE Transactions on Nuclear Science, vol. 44, No. 3, Jun. 1997, pp. 436-442.

Weber et al, Recent Results of the TierPET Scanner, IEEE Transactions on Nuclear Science, vol. 47, No. 4, Aug. 2000, pp. 1665-1669.

Rozsa et al, The Change of Gamma Equivalent Energy with Temperature for Scintillation Detector Assemblies, 2000 IEEE 0-7803-5696, Sep. 2000, pp. 686-690.

* cited by examiner

Fig. 5a (NEUTRON OUTPUT)

Fig. 5b [NaI(Tl)]

Fig. 5c (YAP)

METHOD AND APPARATUS FOR MEASURING RADIATION IN A BOREHOLE

This is a continuation of application Ser. No. 10/307,033 filed Nov. 27, 2002, which is a division of application Ser. No. 10/000,374 filed Oct. 23, 2001.

BACKGROUND OF THE INVENTION

1. Field of the Invention

This disclosure is related to radiation measurements using scintillation type radiation detectors, and more specifically related to apparatus and methods for measuring radiation in a borehole environment using a $YAlO_3$:Ce (YAP) scintillation crystal.

2. Background of the Art

Scintillation type radiation detectors have been used for decades in a wide variety of applications. Radiation absorbed by a scintillation crystal emits a pulse of light or "scintillates". The intensity of light is a function of energy deposited within the crystal by the absorbed radiation. A measure of light intensity can, therefore, be related to the energy of radiation absorbed by the scintillator. A measure of the number of scintillations per unit time can be related to the intensity of radiation absorbed by the scintillation crystal.

In fabricating a scintillation type radiation detector, a scintillation crystal is optically coupled to a light sensitive device that responds to the number and to the intensity of scintillations produced within the crystal. Phomultiplier tubes (PMT) are commonly used as light sensitive devices. A PMT converts scintillations from the coupled crystal into electrical pulses. A pulse is typically generated for each scintillation. The magnitude of the pulse is proportional to the intensity of the scintillation. A count per unit time of pulses can, therefore, be related to the intensity of radiation impinging upon the crystal. Measures of magnitudes of the pulses can, therefore, be related to corresponding energies of the radiation absorbed by the crystal. Alternately, scintillation crystals can be optically coupled to other types of light sensitive devices such as photodiodes, and intensity and energy of impinging radiation can be determined from electrical outputs of these devices.

The scintillation process is not instantaneous and, in fact, the scintillation emission intensity follows an exponential decay. Thallium activated sodium iodide, or NaI(Tl), is a commonly used material in scintillation type gamma radiation detectors. The decay constant of a scintillation produced within a NaI(Tl) crystal by impinging gamma radiation is about 230 nanoseconds (ns). If the intensity of radiation impinging upon the crystal is sufficiently intense to generate a subsequent scintillation pulse before the previous scintillation pulse has decayed to a negligible level, the scintillation pulses will essentially "sum" within the crystal. This is commonly referred to as pulse "pile-up". As an example, two pulses of equal intensity (induced by two gamma rays of equal energy) which pile-up within a detector system will produce a single electrical pulse output with a magnitude greater than a pulse that would be produced by a single gamma ray. Since pulse magnitude is related to radiation energy, pulse pile-up typically results in an erroneous radiation energy measurement. Furthermore, since the pulses "sum" as a single rather than a multiple radiation detector events, pulse pile-up results in erroneous radiation intensity measurements in high intensity gamma ray fluxes. It is, therefore, highly desirable to utilize a scintillation crystal with a minimum light decay constant when measuring energy and intensity of high intensity gamma radiation fluxes. As an example, there is a class of borehole instruments that employs a source of pulsed neutrons and one or more scintillation detectors. Certain measurements, such as inelastic scatter gamma ray measurements, require that the one or more detectors be operated during the neutron burst. This exposes the one or more detectors to extremely high fluxes of gamma ray and other types of radiation. The light decay constant of the scintillation material is, therefore, a critical design parameter in this type of instrumentation.

Many measurement systems using scintillation type gamma ray detectors are also exposed to neutron fluxes. As in the example above, a large variety of borehole instruments used to measure properties of earth formation penetrated by the borehole employ one or more scintillation gamma ray detectors and a neutron source. The neutron source, whether pulsed or continuous, induces gamma radiation within the formation through several types of reactions including inelastic scatter and thermal capture. This induced gamma radiation is sensed by the one or more scintillation detectors and is used to determine formation and borehole parameters of interest. The scintillation detectors are also exposed to neutrons from the source, and especially to thermal neutrons generated in the borehole environs. These neutrons can produce radiation-emitting isotopes within the scintillation crystal. This is commonly referred to as crystal "activation". Consider, as an example a scintillation detector comprising a NaI(Tl) crystal. The thermal neutron capture cross sections for the primary elemental constituents sodium (Na) and iodine (I) are 0.43 barns and 6.15 barns, respectively. Thermal neutrons impinging upon the NaI(Tl) detector produce $^{24}Na$ and $^{128}I$ within the scintillator through the $^{23}Na(n,\gamma)^{24}Na$ and $^{127}I(n,\gamma)^{128}I$ reactions, respectively. Both $^{24}Na$ and $^{128}I$ decay through beta emission with $^{128}I$ also decaying through electron capture. There is often gamma emission subsequent to the beta decay or electron capture. These radiations are generated within the NaI(Tl) crystal, and both the gamma and beta radiation induce scintillations within the crystal. These activation induced radiations are considered as "noise" in the measurement of formation properties using gamma radiation induced within the formation and borehole. It is, therefore, highly desirable to use a scintillation crystal with primary elemental constituents that do not readily "activate" when used in a system which also utilizes a neutron source.

There are other considerations in selecting a scintillation crystal for borehole applications. The borehole environment is typically harsh in that pressures and temperatures are typically high. Borehole instruments are subjected to shock and vibrations as the instrument is typically conveyed within the borehole. Crystals such as NaI(Tl) are highly susceptible to shock induced cleavage, which typically worsens with constant vibration. Cleavage, in turn, results in deteriorating energy resolution and efficiency. As mentioned previously, temperature is usually elevated within a borehole, and typically varies with depth. In particular, variations in temperature can adversely affect crystal scintillation properties of a crystal which, in turn, can adversely affect subsequent radiation energy and intensity measurements. Some scintillation crystals, such as NaI(Tl), are hygroscopic. This requires that the crystal be encased in a hermetically sealed container, which increases the overall dimensions of the crystal package for a given active crystal volume. This increase in size, or the resulting necessity to reduce the active volume of the crystal, can be a critical design factor in borehole instrument fabrication. Inherent crystal gamma ray resolution properties and overall efficiency properties are also factors in borehole logging instrument design.

Other scintillation crystals have been used in borehole applications. Typically, these scintillation materials exhibit advantages over NaI(Tl) in some areas, but exhibit disadvantages in other areas. On such material is bismuth germinate (BGO), with properties well documented in the literature.

The scintillation material cerium activated yttrium aluminum perovskite or YAlO$_3$:Ce (YAP) has a density of 5.55 grams per cubic centimeter (g/cm3), an effective Z of 36, a light decay constant of 27 ns, light output of 45% of NaI at 25° C., 18,000 photons/MeV, emission peak of 350 nanometer (nm), and an index of refraction of 1.94. Thermal neutron cross sections for the major constituents of the crystal yttrium, aluminum and oxygen are 1.28 barns, 0.230 barns and 0.00019 barns, respectively. The activity produced by thermal neutron capture in yttruim is relatively long-lived so that decay radiation is negligible compared to that observed from iodine activation in NaI crystals.

YAP has been used in the prior art in a number of non-borehole scintillation detector applications, and especially in the field of medical imaging. Typical prior art applications are summarized below.

A gamma ray camera system comprising an array of YAP(Ce) scintillation crystals optically coupled to a position sensitive photomultiplier tube is disclosed in "YAP Multi-Crystal Gamma Camera Prototype", K. Blazek et al, IEEE Transactions on Nuclear Science, Vol. 42, No. 5, October 1995. The multiple scintillation crystals are optically isolated from one another.

A scintillator detector with multiple YAP crystals and other types of crystals is disclosed in "Blue Enhanced Large Area Avalanche Photodiodes in Scintillation Detection with LSO, YAP and LuAP Crystals", M. Moszynski et al, IEEE Transactions on Nuclear Science, Vol. 44, No. 3, June 1997. Scintillator crystals are optically coupled to large area avalanche photodiodes.

A high resolution positron emission tomograph (TierPET) for imaging small laboratory animals is discloses in "Recent Results of the TierPET Scanner", S. Weber et al, IEEE Transactions on Nuclear Science, Vol. 47, No. 4, August 2000. The system is based on an array of YAP crystals. 20×20 arrays of 2×2×15 mm polished YAP crystals are optically coupled to a position sensitive PMT.

U.S. Pat. No. 5,313,504 to John B. Czirr discloses the use of a YAP scintillator in a borehole instrument to monitor output of a neutron source that is also disposed within the borehole instrument. Since the YAP scintillator is used in a neutron source monitor system, the instrument is designed to maximize the response of the YAP scintillator to the neutron source and, conversely, to minimize the response of the YAP scintillator to the borehole environs.

None of the above cited references discloses a system that is suitable for operation within a borehole to measure properties of the borehole environs.

SUMMARY OF THE INVENTION

The scintillation material YAlO$_3$:Ce (YAP) possesses many properties, as summarized above, which are ideally suited for use in scintillation type radiation detectors in borehole instrumentation. More specifically, YAP is rugged and less subject to shock and vibration damage when compared to other commonly used crystals such as NaI(Tl). YAP is not hygroscopic thereby eliminating the need of hermetic packaging required for NaI(Tl) crystals. This increases design flexibility in borehole instrumentation. YAP is relatively high density (5.55 g/cm$^3$), and is of similar efficiency to NaI(Tl) over the integrated energy range of 0.1 to 9.5 MeV. The major constituents of YAP are less susceptible to thermal neutron activation than NaI(Tl). YAP is less susceptible to variation in temperature than NaI(Tl). Temperature properties of YAP are discussed in detail in "The Change of Gamma Equivalent Energy with Temperature for scintillation Detector Assemblies", C. Rozsa, et al, Nuclear Science Symposium, 1999. Conference Record. 1999 IEEE, Volume: 2, 1999 Page(s): 686–690 vol.2. The change of relative light output of responses of YAP(Ce) scintillators to alpha and gamma radiation was investigated over the temperature range −20 degrees Centigrade (° C.) to 70° C.

Probably the most significant characteristic of YAP, with respect to borehole instrumentation design, is the scintillation light decay constant which is approximately ten times less than that of NaI(Tl). This reduces the problem of pulse pile-up in high intensity radiation fields. In non-pileup conditions, energy resolution of NaI(Tl) is somewhat better across the entire spectrum than the resolution of YAP. In high intensity fluxes, however, where pulse pile-up is a significant factor in NaI(Tl) detectors, YAP detectors with significantly shorter light decay constant exhibits superior energy resolution. These properties are especially important in certain types of borehole instrumentation, which will be discussed in detail in subsequent sections of this disclosure.

Borehole logging instruments or "logging tools" can be embodied in a variety of ways depending upon the desired borehole environs measurements. Tools detailed in this disclosure contain at least one radiation detector comprising a YAP scintillation crystal optically coupled to a light sensing device such as a photomultiplier tube (PMT), a photodiode, or the like, which converts scintillation intensity to an electrical pulse of proportional magnitude. The detector assembly is preferably enclosed within a pressure housing for protection from the harsh borehole environment. The tool is conveyed along the borehole by means of a wireline, a drill string or a slick line.

Scintillation detector based formation evaluation instruments, whether wireline or logging while-drilling (LWD) tools, can be embodied to measure a wide variety of parameters. In one embodiment, the tool is used to measure only natural gamma radiation emitted by formation penetrated by the borehole, or gamma radiation emitted by materials such as radioactive "tagged" tracer materials within or in the immediate vicinity of the borehole. Other classes of formation evaluation tools contain one or more sources of radiation, such as a neutron source, which induces a variety of reactions within the formation and borehole. Radiation produced by these reactions is typically measured by one or more scintillation detectors within the tool. Formation and borehole parameters of interest are then determined from the response of the one or more detectors. The source of radiation within the tool can be continuous or pulsed. Detectors are operated at specified times during a pulsed radiation cycle to optimize the measure of radiation from specific reactions of interest.

This disclosure will be directed toward a YAP borehole scintillation detector embodied in a formation evaluation tool comprising a pulsed source of 14 MeV neutrons. It should be understood that the YAP borehole scintillation detector can effectively be embodied in borehole instruments containing other sources of radiation, and further embodied as a plurality of detectors. This disclosure will further be directed to a logging system wherein at least one YAP scintillation detector is operated during each neutron pulse thereby exposing the detector to an intense radiation flux. An additional embodiment of the YAP scintillator operates the YAP scintillation detector during the quiescent period between neutron pulses. Still further embodiments operate the detector during the pulse and during the quiescent periods between pulses, or operate the detector without the use of a source.

Either gross count rate or spectral energy count rates can be measured by the disclosed logging system for conversion into borehole and formation parameters of interest. As an example, gamma radiation sensed by the YAP scintillation detector can be recorded in a plurality of energy ranges or "windows" and these window count rates can be related to specific reactions which, in turn, can be related to concentrations of specific elements within the formation penetrated by the borehole.

Other types of radiation, such as beta radiation, can generate scintillations within a YAP scintillation crystal. This disclosure will, however, be directed primarily to systems which involve the measurement of gamma radiation.

BRIEF DESCRIPTION OF THE DRAWINGS

So that the manner in which the above recited features, advantages and objects of the present invention are obtained and can be understood in detail, more particular description of the invention, briefly summarized above, may be had by reference to the embodiments thereof which are illustrated in the appended drawings.

DETAILED DESCRIPTION OF THE PREFERRED EMBODIMENTS

Figure 1:
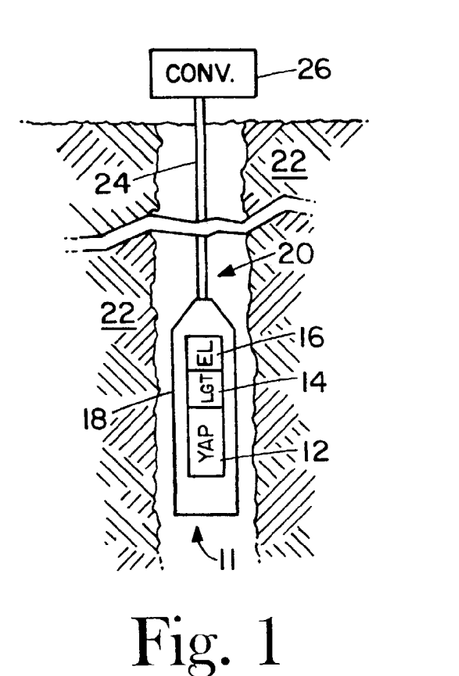
FIG. 1 depicts a YAP scintillation crystal and cooperating other elements to form a YAP radiation detector deployed in a borehole.

A borehole logging tool comprising YAP radiation detectors can be embodied in a variety of ways depending upon the desired borehole environs for the measurements. FIG. 1 illustrates a logging tool 11 comprising a YAP scintillation crystal 12 optically coupled to a light sensing device 14 such as a photomultiplier tube (PMT), a photodiode, or the like, which converts scintillation intensity to an electrical pulse of proportional magnitude. The light sensing device 14 is typically powered and controlled by an electronic package 16. The electronics package 16 can also contain data processing equipment, such as circuits to determine the intensity and energy of radiation impinging upon and interacting with the scintillation crystal 12. The electronics package 16 can also contain computing means to transform radiation energy and intensity into parameters of interest. The scintillation crystal 12, light sensing device 14 and electronics package 16 are enclosed within a pressure housing 18 for protection from the harsh borehole environment. The tool is conveyed along a borehole 20 penetrating an earth formation 22 by a conveyance system including a member 24 which extends from the tool 11 to a surface conveyance unit 26. If the conveyance system is a wireline logging system, the member 24 is a wireline logging cable, and the surface conveyance unit 26 comprises wireline draw works and surface equipment well known in the art. If the conveyance system is a drilling rig, the member 24 is a drill pipe string and the surface conveyance 26 comprises a drilling rig, which is also well known in the art. Other conveyance systems, such as a slickline system, can be used to convey the tool 11 along the borehole 20. The surface conveyance unit 26 can also contain data processing equipment, such as circuits to determine the intensity and energy of radiation impinging upon and interacting with the scintillation crystal 12. The surface conveyance unit 26 can also contain computing means to transform radiation energy and intensity into parameters of interest. Embodied as the tool 11, typical measurements from the system would be naturally occurring gamma radiation emitted by the formation, or gamma radiation from radioactive tagged fluids and propants used in formation fracturing operations.

Figure 2:
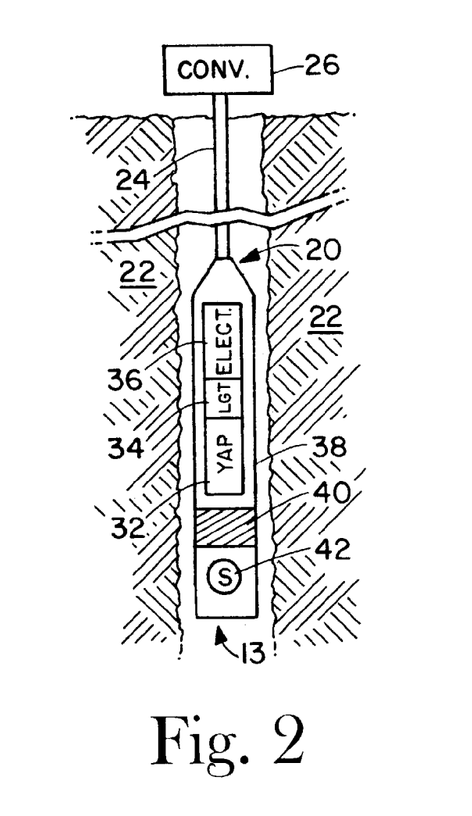
FIG. 2 illustrates a logging tool utilizing a YAP radiation detector and a source of radiation.

FIG. 2 illustrates a YAP radiation detector embodied as a logging instrument 13 comprising a radiation source 42. The source can be an isotopic neutron source such as Americium-beryllium (Am—Be), a neutron generator, or any other type of radiation source, such as an isotopic gamma ray source or a high energy gamma ray source comprising an accelerator. It will be assumed that the source 42 is a neutron generator, which is operated to produce pulses of neutron of energy around 14 MeV. The source 42, along with a YAP scintillation crystal 32, an optically coupled light sensing device 34, and a controlling electronics package 36 are all disposed within a pressure housing 38. Shielding material 40 is typically used to minimize direct irradiation of the crystal 32 by the source 42. It should be understood that additional YAP detectors can be used within the pressure housing 38 to enhance measurements or to obtain additional measurements of interest.

Still referring to FIG. 2, neutrons emitted by the source 42 induce a variety of reactions within the formation and the borehole environs. Radiation produced by these reactions are sensed by the YAP scintillation detector within the tool 13, and parameters of the formation 22 and the borehole 20 are determined from the response of the one or more detectors. The neutron source is pulsed for tool embodiments discussed below. Pulse duration and pulse repetition rate parameters are adjusted to optimize the neutron induced reactions of interest. Likewise, the YAP detector is operated at specified times during a pulsed radiation cycle to optimize the measure of radiation from specific reactions of interest.

The electronics package 36, and the surface conveyance unit 26, can contain data processing equipment, such as circuits to determine the intensity and energy of radiation impinging upon and interacting with the scintillation crystal 32. The electronics package 36, and the surface conveyance unit 26, can also contain computing means to transform radiation energy and intensity into parameters of interest.

Figure 3A:
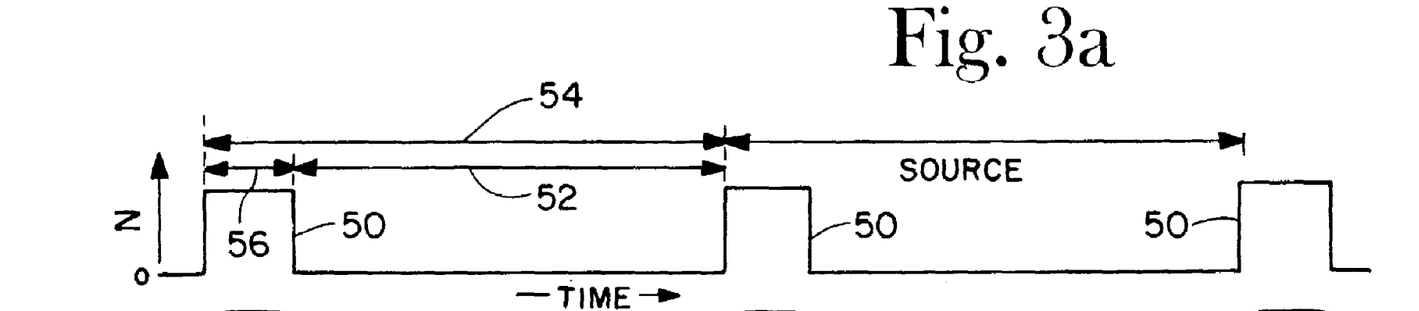
FIG. 3a is a pulsed neutron timing diagram for a thermal neutron decay type logging tool.
Figure 3B:
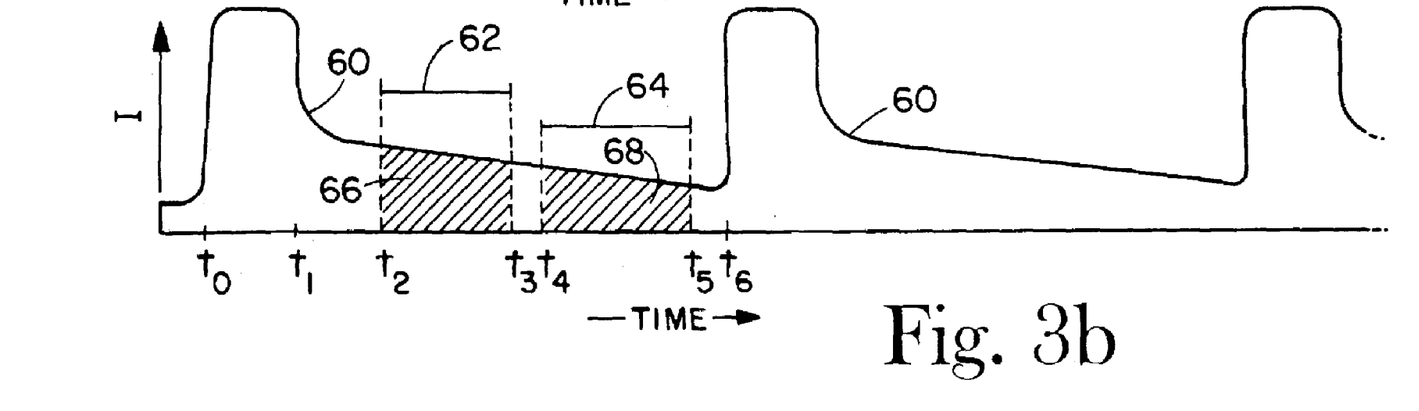
FIG. 3b is a timing and response diagram of a YAP radiation detector disposed in a thermal neutron decay type logging tool.

The determination of formation saline water saturation from a measure of the rate of thermal neutron capture was first introduced commercially in the 1960s. This logging system is well known in the industry under the generic name "thermal neutron decay" log and by a variety of service names. FIGS. 3a and 3b illustrate conceptually the YAP detector embodied in a thermal neutron decay tool.

FIG. 3a is a plot of neutron source output N as a function of time, and illustrates the neutron source pulse timing for the tool 13 embodied as a thermal neutron decay type logging system. Referring to both FIGS. 2 and 3, the source 42 is used to generate a sequence of neutron pulses 50 of time duration 56. The pulses 50 are repeated periodically after a time interval 54, with a quiescent time 52 being measured from the termination of a previous pulse to the initiation of a subsequent pulse. In typical formation and borehole conditions, the thermalization of fast neutrons from the 14 MeV source and subsequent capture of thermal neutrons by elements within the formation occurs at a rate with a half life of several hundred microseconds. The pulse repetition rate is typically about 1,000 pulses per second with a pulse width 56 of 50 to 100 µs. The quiescent period 52 is, therefore typically 900 to 950 µs.

FIG. 3b is a plot 60 of the natural logarithm of gamma radiation intensity I measured as a function of time. During the time interval $t_0$ to $t_1$ when the neutron source 42 is operating, composite gamma radiation is quite intense as can be seen from the magnitude of the curve 60. This composite gamma radiation comprises gamma radiation from inelastic scatter reactions, and to a lesser extent gamma radiation from thermal capture reactions, naturally occurring gamma radiation from the borehole environments and even a small component of neutron induced activation within the YAP crystal 32. Since the thermalization and capture process is relatively slow, gamma radiation resulting primarily from thermal neutron capture reactions are measured with the YAP detector during at least two time intervals 62 and 64 occurring in the quiescent period 52 between neutron pulses 50. The detector is first operated starting at a time $t_2$ and ending at a time $t_3$ yielding a count 66 as illustrated graphically by the shaded area. The detector is again operated starting at a time $t_4$ and terminated at a time $t_5$ yielding a count 68, again as illustrated graphically by the shaded area. Radiation is typically not intense within these time intervals, therefore pulse pile-up is not a problem. The counts 66 and 68 are combined to obtain the parameter of interest (saline water saturation) using methods well known in the art.

Figure 4A:
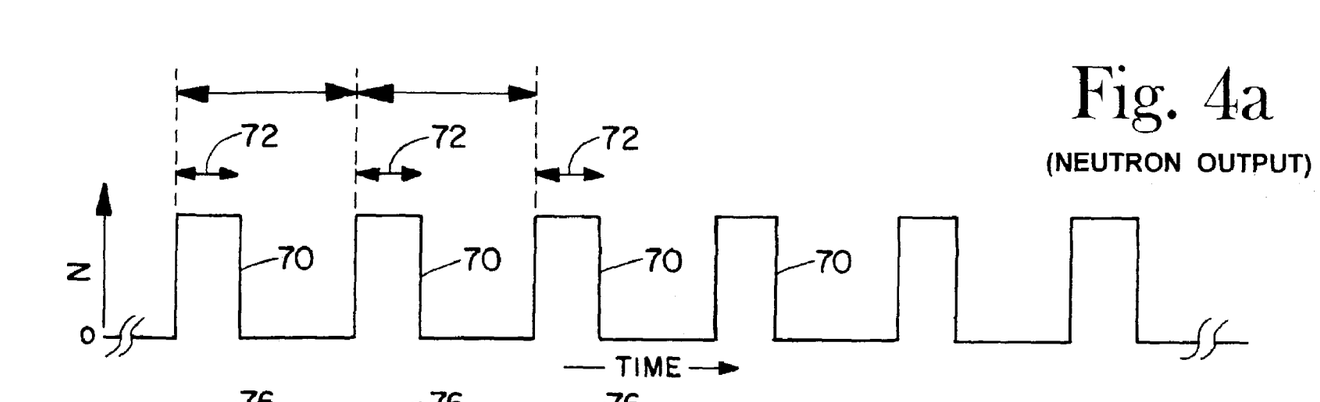
FIG. 4a is a pulsed neutron timing diagram for an inelastic scatter type logging tool.
Figure 4B:
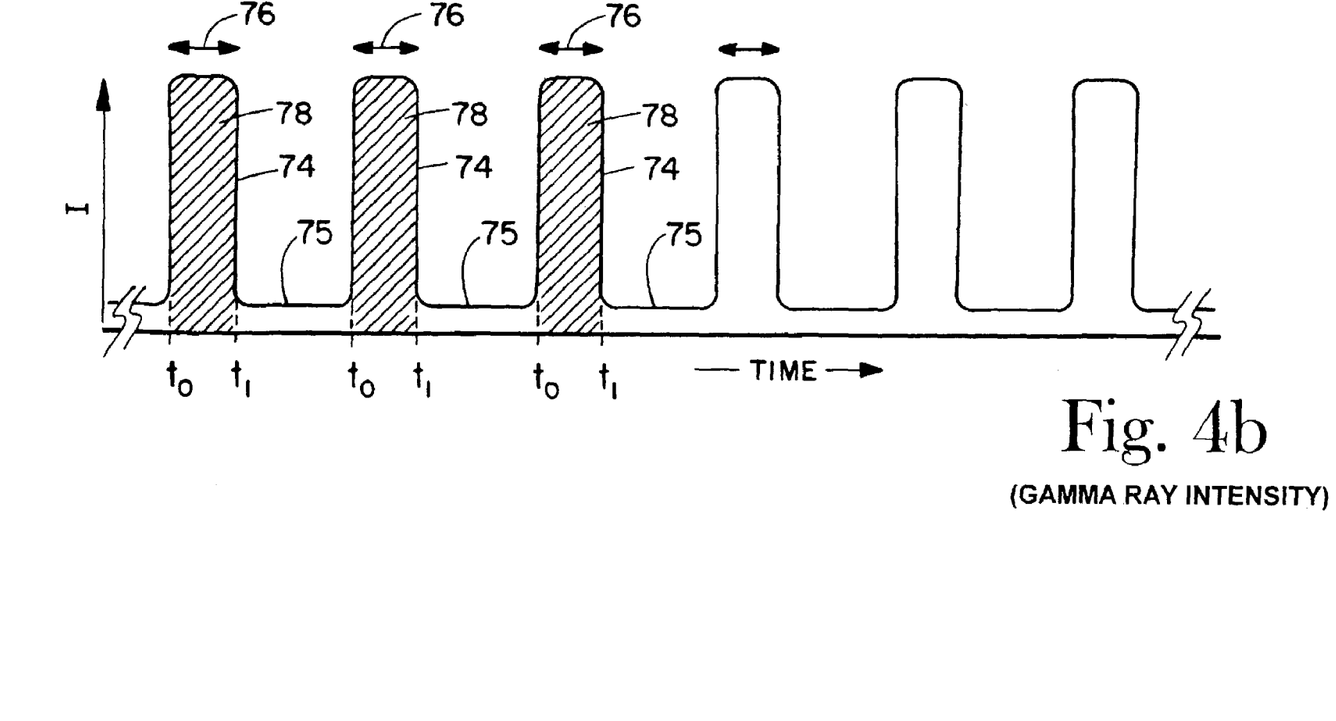
FIG. 4b is a gamma ray production diagram for an inelastic scatter type logging tool.

The determination of formation fresh water saturation from a measure of gamma radiation resulting from neutron inelastic scatter was first introduced commercially in the 1970s, and is generically known as the "carbon/oxygen" "neutron inelastic scatter" log. FIGS. 4a and 4b illustrate the logging tool 13 embodied as an inelastic scatter type logging system.

Attention is first directed to FIGS. 2 and 4a. FIG. 4a is a plot of neutron output N from the source 42 plotted as a function of time. Pulses 70 of 14 MeV neutrons from the source 42 induce inelastic scatter reactions within the formation 22 penetrated by the borehole 20. FIG. 4b illustrates total gamma radiation flux for the source neutron output N of FIG. 4a. Compared with the thermal neutron capture process, the inelastic scatter process is much faster and, in practice, is essentially instantaneous. As a result, measured radiation is very intense during each neutron burst spanning the time interval $t_0$ to $t_1$ as illustrated in FIG. 4b. This radiation is primarily generated by inelastic scatter reactions. Because of the essentially instantaneous speed of the inelastic scatter reactions, the YAP detector must be operated during the neutron pulse within a time interval $t_0$ to $t_1$ thereby exposing the YAP to very intense radiation. Pulse repetition rate is typically 10,000 to 20,000 pulses per second since no measurements are made during the quiescent period between pulses 74. The relatively low level of gamma radiation 75 shown between pulses 70 typically comprises thermal capture radiation (capture component typically is larger than shown, relative to gammas during pulse), naturally occurring gamma radiation, and possibly very low levels of activation radiation from within the YAP crystal. Neutron pulse width 72 is also reduced to about 5 µs to allow for the increased pulse repetition rate.

Pulse pile-up in a gamma ray detector in intense gamma radiation fields is a significant problem as discussed previously. This is the case when the tool 13 is embodied as an inelastic scatter type tool because of the intense radiation flux in which the detector must operate during a neutron pulse. The use of a YAP scintillation crystal, with its relatively short light decay constant, results in a significantly improved system when compared to prior art systems using a NaI(Tl) crystal with a light decay constant which is an order of magnitude greater.

Figure 5A:
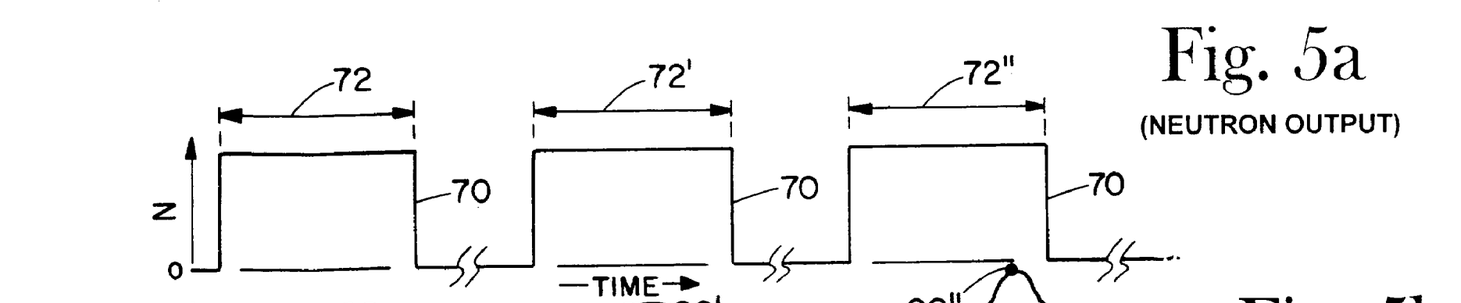
FIG. 5a is an enlarged pulsed neutron timing diagram for an inelastic scatter type logging tool.

FIG. 5a illustrates enlarged views of three consecutive neutron pulses 70 as shown previously in FIG. 4a. The effects of pulse pile-up, and the minimization of this problem using a YAP scintillation crystal, will be illustrated with the following hypothetical example.

Figures 5B, 5C:
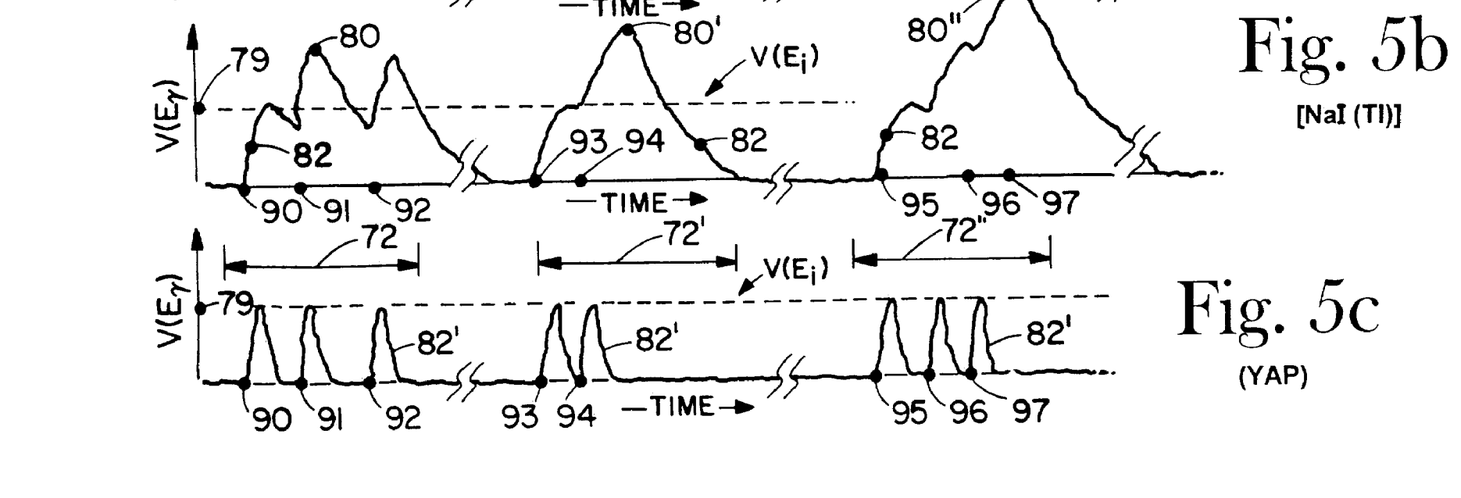
FIG. 5b is a corresponding timing and response diagram for a NaI(Tl) gamma ray detector disposed in an inelastic scatter gamma ray type logging tool.
FIG. 5c is a corresponding timing and response diagram for a YAP gamma ray detector disposed in an inelastic scatter gamma ray type logging tool.

Attention is first directed to FIG. 5b. Assume that three gamma rays of equal energy $E_i$ impinge upon a NaI(Tl) detector during a time interval 72 during the first neutron pulse 70 at times 90, 91 and 92. FIG. 5b illustrates as a curve 82 voltage $V(E_\gamma)$ generated by the light sensing device optically coupled to the NaI(Tl) detector. The value of $V(E_\gamma)$ shown at 79 represents voltage representative of a gamma ray of energy $E_i$ if no pileup were present. Because of the relatively long light decay constant of NaI(Tl), the corresponding voltage $V(E_{65})$ from the gamma ray impinging at time 90 does not decay to a negligible level before the voltage buildup from the gamma ray impinging at time 91. Voltage $V(E_\gamma)$ from the gamma ray impinging at time 91 does not decay to a negligible level before the voltage buildup from the gamma ray impinging at time 92. The result is pulse pile-up that produces a cumulative voltage pulse $V(E_\gamma)$ of magnitude 80, which is clearly greater that the value 79 that would be produced in the absence of pile-up. Next assume that two gamma rays of energy $E_i$ impinge upon the NaI(Tl) detector at times 93 and 94 during the time interval 72'. The time interval between the two gamma rays is less that the time interval between any of the impinging gamma rays from the previous time interval 72. Pile-up is again a significant problem producing a cumulative voltage pulse $V(E_\gamma)$ of magnitude 80', which is clearly greater that the value 79 that would be produced in the absence of pile-up. Finally, assume that three gamma rays of energy $E_i$ impinge upon the NaI(Tl) detector at times 95, 96 and 97 during the time interval 72". The time interval spanned by the three gamma rays is less that the time interval spanned by the three impinging gamma rays from the previous time interval 72. Pile-up is even more significant than the previous two examples, yielding a cumulative voltage pulse $V(E_\gamma)$ of magnitude 80" which is clearly greater that the pile-up values 80 and 80'.

Attention is now directed to FIG. 5c. Assume that the three gamma rays of equal energy $E_i$ impinge upon a YAP detector during the time interval 72 of the first neutron pulse 70, again at the times 90, 91 and 92. FIG. 5c illustrates as a curve 82' the voltage $V(E_\gamma)$ generated by the light sensing device optically coupled to the YAP detector. The value of $V(E_\gamma)$ shown at 79 again represents voltage representative of a gamma ray of energy $E_i$ if no pileup is present. Because of the relatively short light decay constant of YAP, the corresponding voltage $V(E_\gamma)$ from the gamma ray impinging at time 90 does decay to a negligible level before the voltage buildup from the gamma ray impinging at time 91. Voltage $V(E_\gamma)$ from the gamma ray impinging at time 91 does decay to a negligible level before the voltage buildup from the gamma ray impinging at time 92. This results in three well resolved pulses which produce separate voltage pulses $V(E_\gamma)$ of magnitude 79 corresponding to three gamma rays of $E_\gamma$. Stated another way, there is no pulse pile-up. Next consider the two gamma rays of energy $E_i$ impinging upon the YAP detector at times 93 and 94 during the time interval 72'. As stated previously, the time interval between the two gamma rays is less that the time interval between any of the impinging gamma rays from the previous time interval 72. The YAP detector system is still able to properly resolve the two gamma rays and generate the correct voltage pulses $V(E_\gamma)$ of magnitude 79. Finally, again consider the three gamma rays of energy $E_i$ which impinge upon the YAP detector at times 95, 96 and 97 during the time interval 72". Although the time interval spanned by the three gamma rays is less that the time interval spanned by the three impinging gamma rays from the previous time interval 72, the YAP detector system is still able to properly resolve the three gamma rays and generate the correct voltage pulses $V(E_\gamma)$ of magnitude 79. Again, there is no pulse pile-up in the YAP crystal. For the three hypothetical examples, pulse pile-up is eliminated using the YAP detector system.

Figure 6:
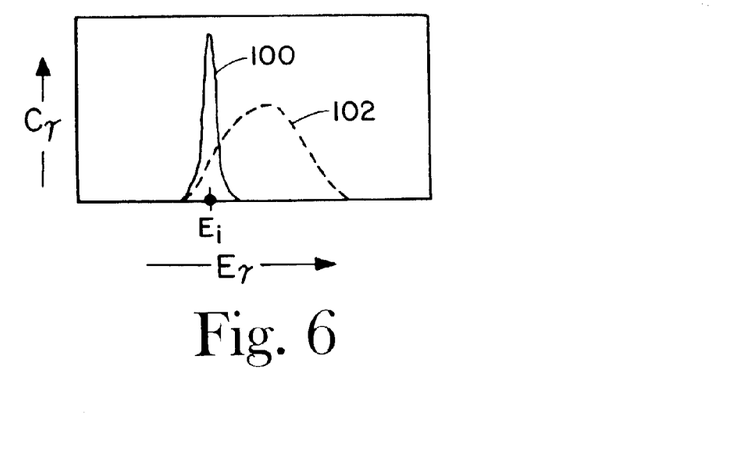
FIG. 6 illustrates the energy response of NaI(Tl) and YAP scintillation detectors in an intense flux of monoenergetic gamma radiation.

FIG. 6 is a gamma ray energy spectrum consisting of a plot of measured gamma ray intensity $C_\gamma$ as a function of gamma ray energy $E_\gamma$. Curve 102 represents a spectrum from the hypothetical example using the NaI(Tl) detector system illustrated in FIG. 4b. The curve, which was induced by monoenergetic gamma radiation of energy $E_i$, does not peak sharply at $E_i$, but is significantly broadened to the high energy side by pulse pile-up. Curve 100 represents a spectrum from the hypothetical example using the YAP detector system illustrated in FIG. 4c. Since no pulse pile-up is present in the YAP detector, the spectrum is peaked sharply at energy $E_i$.

The examples discussed above and illustrated in FIGS. 5a–5c and FIG. 6 clearly illustrate the advantages of a YAP detector system in borehole applications, especially in high intensity gamma ray flux fields. The light responsive means 14 and 34, and the electronic packages 16 and 36 (see FIGS. 1 and 2), are designed to efficiently process the scintillations generated by YAP scintillation crystals. In borehole instrumentation, the light responsive means is typically a photomultiplier tube. The PMT is selected with dynode string to effectively process scintillation output pulses with short light decay constants. Pulses are typically preamplified by circuitry in the cooperating electronics package. Preferably a charge integrating preamplifier is used, wherein the preamplifier outputs electrical pulses with rise and decay times commensurate with the short light constant pulses generated by the YAP scintillator. Proper selection of light responsive means and the use of complementary "fast" pre-amplification circuitry yields a detector assembly which efficiently processes scintillations with short light decay times. This efficient processing minimizes pulse pile-up in the detector assembly.

Figure 7:
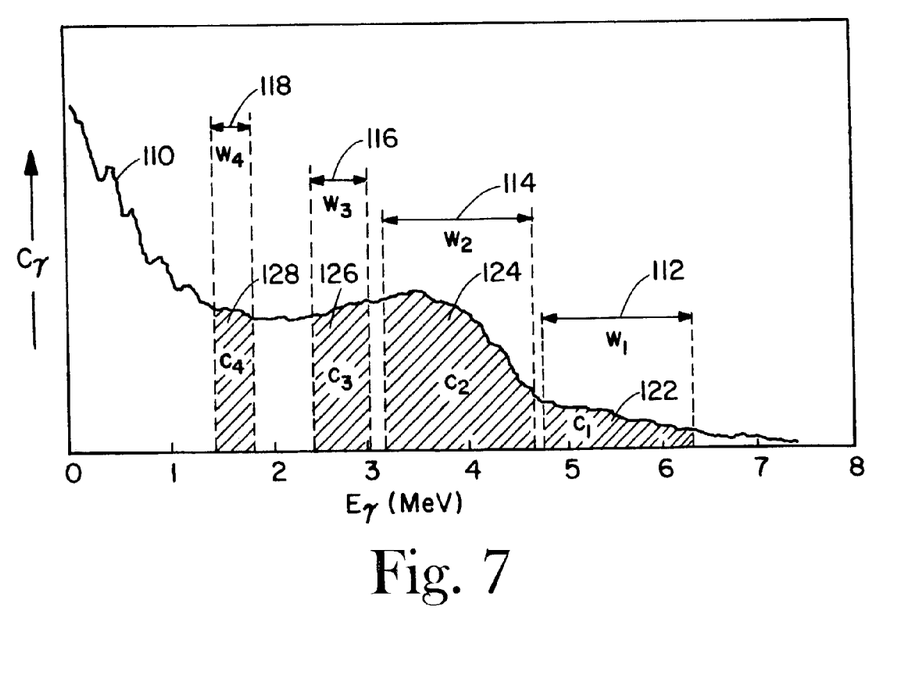
FIG. 7 illustrates a gamma ray energy spectrum and selected energy windows used in an inelastic scatter type gamma ray logging system to determine borehole and formation parameters of interest.

FIG. 7 illustrates a typical gamma ray spectrum measured with the tool 13 configured to detect inelastic scatter radiation. Typically measured counts $C_\gamma$ are integrated over preselected energy ranges or "windows" to obtain counts needed to determine formation and borehole parameters of interest. As an example, four energy windows $W_1$, $W_2$, $W_3$ and $W_4$ are shown at 112, 114, 116 and 118, respectively. Corresponding integrated counts $C_1$, $C_2$, $C_3$ and $C_4$ are shown at 122, 124, 126 and 128, respectively, as represented by shaded areas. The windows $W_1$, $W_2$, $W_3$ and $W_4$ (and thus corresponding counts $C_1$, $C_2$, $C_3$ and $C_4$) might contain radiation from inelastic scatter of neutrons from oxygen, carbon, calcium and silicon nuclei. These count rates can then be combined to obtain measures of fresh water formation saturation using methods well known in the industry.

As mentioned previously, the YAP scintillation crystal posseses many properties which are ideally suited for borehole instrumentation. YAP is rugged and less subject to shock and vibration damage when compared to other commonly used crystals such as NaI(Tl). YAP is not hygroscopic thereby eliminating the need of hermetic packaging required for NaI(Tl) crystals, and thereby increasing design flexibility in borehole instrumentation. YAP is relatively high density (5.55 g/cm$^3$), and is similar in efficiency in the detection of gamma radiation to NaI(Tl) over the integrated energy range of 0.1 to 9.5 MeV. The major constituents of YAP are less susceptible to thermal neutron activation than the major constituents of NaI(Tl). YAP is less susceptible to variation in temperature than NaI(Tl). In addition to measuring gamma radiation from reactions in the formation and borehole, YAP can be used in conjunction with the borehole environs measurement as a neutron source monitoring system.

There are other applications and processing procedures of the invention that will become apparent to those of ordinary skill in the art.

While the foregoing disclosure is directed toward the preferred embodiments of the invention, the scope of the invention is defined by the claims, which follow.

What is claimed is:

1. A method for measuring a property of material penetrated by a borehole comprising the steps of:
    (a) irradiating said material with a source of radiation generating a plurality pulses of neutrons of about five microseconds per pulse and at a periodic pulse repetition rate of about 10,000 to 20,000 pulses per second thereby inducing gamma radiation within said material;
    (b) measuring said induced radiation with a single radiation detector comprising a YAP scintillator crystal, a light responsive means coupled to said scintillator crystal, and circuitry connected to said light responsive means for processing output from said scintillator crystal, wherein said detector is operated during each of said pulses, and
    (c) determining said property from said measure of said induced radiation, wherein
    (d) said radiation detector processes and resolves up to three detected scintillations without scintillation pulse pile-up during each said neutron pulse.

2. The method of claim 1 comprising the additional step of generating said pulses at said pulse repetition rate at about 20,000 pulses per second.

3. The method of claim 2 comprising the additional step of operating said detector to measure energy of said gamma radiation during said pulses.

4. The method of claim 1 wherein said gamma radiation results from neutron inelastic scatter.

5. The method of claim 1 comprising the additional steps of:
   (a) disposing said source and said radiation detector in a housing; and
   (b) conveying said housing along a borehole by means of a wireline.

6. The method of claim 1 comprising the additional steps of:
   (a) disposing said source and said radiation detector in a housing; and
   (b) conveying said housing along a borehole by means of a drill string.

7. The method of claim 4 comprising the additional step of measuring said gamma radiation in at least one energy window.

8. The method of claim 4 comprising the additional step of measuring said gamma radiation in a plurality of energy windows representing inelastic scatter of neutrons from oxygen, carbon, calcium and silicon.

9. A method for measuring a property of material penetrated by a borehole comprising the steps of:
   (a) irradiating said material with a source of radiation generating a plurality of pulses of neutrons at a periodic repetition rate thereby inducing gamma radiation within said material;
   (b) measuring said induced radiation with a single radiation detector comprising a YAP scintillator crystal, a light responsive means coupled to said scintillator crystal, and circuitry connected to said light responsive means for processing output from said scintillator crystal, and
   (c) determining said property from said measure of said induced radiation, wherein
   (d) said radiation detector processes and resolves a plurality of detected scintillations measured without scintillation pulse pile-up during a time interval of about 5 microseconds,
   (e) energy of each said gamma ray inducing each said detected scintillation is determined, and
   (f) at least one energy window is obtained by integrating said gamma rays over a predetermined energy range.

10. The method of claim 9 wherein said detector is operated during each of said pulses.

11. The method of claim 9 comprising the additional step of pulsing said neutron source at a pulse repetition rate greater than 10,000 pulses per second.

12. The method of claim 9 comprising the additional step of operating said radiation detector coincident with each said pulse from said neutron source.

13. The method of claim 9 comprising the additional step of operating said radiation detector during quiescent periods between pulses from said pulsing neutron source.

14. The method of claim 9 wherein said gamma radiation results from neutron inelastic scattering.

15. The method of claim 9 comprising the additional steps of:
   (a) disposing said source of radiation and said radiation detector in a housing; and
   (b) conveying said housing along a borehole by means of a wireline.

16. The method of claim 9 comprising the additional steps of:
   (a) disposing said source of radiation and said radiation detector in a housing; and
   (b) conveying said housing along a borehole by means of a drill string.

* * * * *